April 21, 1964 E. B. B. CALLICK 3,130,346

UNIFORM BRIGHTNESS CONTROL

Filed Feb. 21, 1961

INVENTOR
Eric Brian Butler Callick
BY Baldwin & Wight
ATTORNEYS 3,130,346
Patented Apr. 21, 1964

3,130,346

UNIFORM BRIGHTNESS CONTROL

Eric Brian Butler Callick, Chelmsford, England, assignor to English Electric Valve Company Limited, London, England, a British company Filed Feb. 21, 1961, Ser. No. 90,714
Claims priority, application Great Britain Mar. 21, 1960
4 Claims. (Cl. 315—22)

Figure 1:
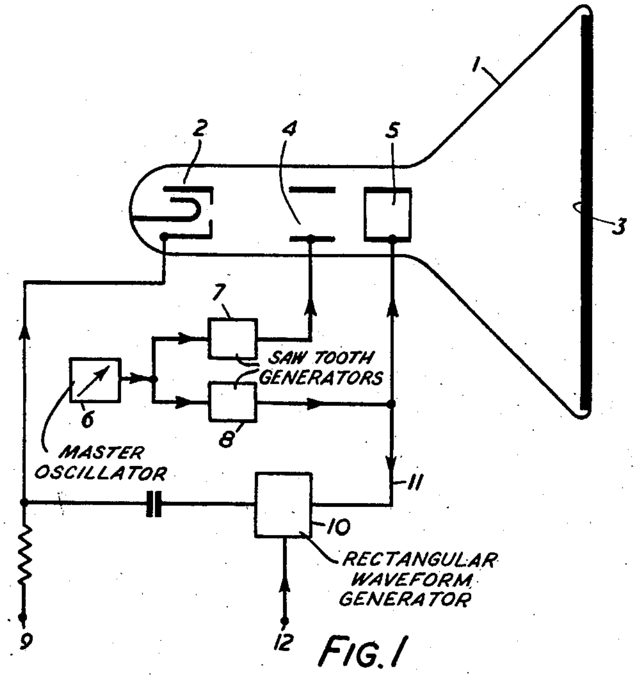

This invention relates to cathode ray tube display arrangements, that is to say, to display arrangements of the kind in which a signal (or a picture or some other intelligence) is displayed on the fluorescent screen of a cathode ray tube by means of a scanning electron beam. The invention, though applicable generally to display arrangements of the kind referred to, is primarily intended for, and is of great advantage when applied to, display arrangements utilising so-called direct viewing storage cathode ray tubes. These tubes, which are now well known, include two electron guns—namely a so-called "writing" gun and a so-called "flood" gun—a charge storing mesh or grid and a fluorescent screen on the side of the side of the mesh remote from the guns. The signal to be displayed is applied to the writing gun to modulate the beam thereof while said beam is deflected across the mesh and, as a result, the said signal is stored on the mesh in the form of a stored charge pattern. The flood gun is then used to "flood-illuminate" the mesh, the charge pattern of which determines where the electrons from the flood gun will pass through to the screen, and thus the signal is displayed.

Normal practice with display arrangements of the kind referred to is to employ the signal to be displayed to modulate the intensity of the effective scanning beam in the tube, i.e. the only beam in the case of a simple cathode ray tube or the writing beam in the case of a direct viewing tsorage tube. This practice has the important defect that the brightness of the resultant display depends, inter alia, on the speed of scanning of the scanning beam and if this speed is varied—and in many cases it may be varied substantially for one reason or another—the brightness of the display correspondingly varies being least when the scanning speed is highest. In the case of a display arrangement employing a direct viewing storage tube having its writing gun beam modulated in intensity in accordance with the signal to be displayed, the charge deposited on an elemental area of the storage mesh when the beam is modulated to a given intensity will be less if the beam scanning speed across that area is high than it is if the said speed is low, and since the brightness of the display produced when the flood gun is in action depends on the charges stored on the mesh, the final display is most undesirably dependent on scanning speed. A similarly undesirable result of brightness variation caused by scanning speed variation is also produced in the case of an ordinary cathode ray tube with a scanning beam which is signal modulated in intensity, for here also the brightness of any elemental area of the screen is dependent inter alia on the length of time the scanning beam impinges on that area. The present invention seeks to avoid this defect.

According to this invention a cathode ray tube display arrangement of the kind referred to comprises means for alternately switching the scanning electron beam between predetermined limits of intensity at a cyclic frequency which is co-related to the scanning speed in such manner that said beam has one limiting intensity during part of each period during which it moves through its own width and the other limiting intensity during the remaining part of said period, and means, controlled by the signal to be displayed, for controlling the length of at least one of the two parts which make up said period.

Preferably one of said limiting intensities is zero intensity, i.e. the beam is completely switched off durng part of each of said periods.

Preferably also the signal control is employed to control only the lengths of the parts of the said periods during which the beam is of the larger intensity.

Expressing the invention in another way, the said invention comprises means for subjecting the beam to control of one or another of two predetermined limits of intensity, by a signal controlled, pulse width modulated wave of a frequency whose time period equals the time taken by the beam to move in the direction of scanning by the width of said beam on the area scanned. Since the beam is not, as is the case in normal practice, intensity modulated by the signal to be displayed but is switched between limits at a frequency co-related with the speed of scanning, being held at the upper limit for cyclically recurring times each of length controlled by the signal, the aforementioned defect of beam intensity modulated arrangements is avoided. By "width" of the beam is meant, of course, that dimension of the beam (on the scanned area) which lies in the direction of scanning.

Figure 3:
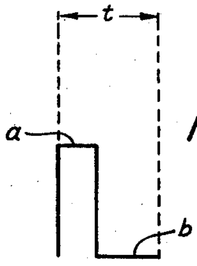
Figure 2:
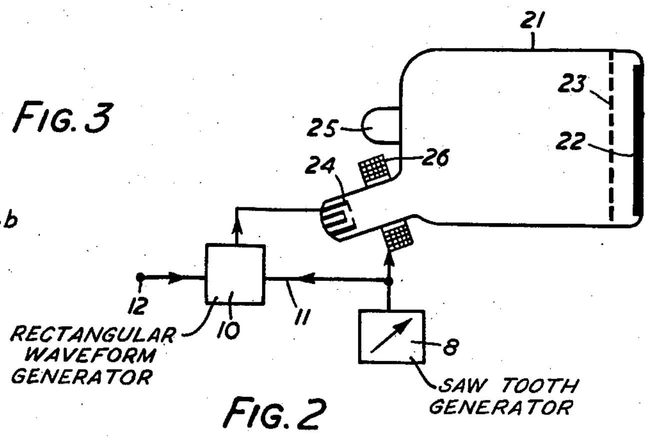

The invention is illustrated in the accompanying drawing which includes combined simplified schematic and diagrammatic views of two embodiments, FIGURE 1 showing one way of applying the invention to an ordinary cathode ray tube of a type commonly used in oscilloscopes, FIGURE 2 shows the invention as applied to a direct viewing storage tube, and FIGURE 3 is an illustrative time plot of the output waveform of generator 10.

Referring to FIGURE 1, the cathode ray tube 1 therein shown has the customery electron gun with control electrode 2, fluorescent screen 3 on the end of the tube; and mutually perpendicular deflecting means exemplified as pairs of plates 4 and 5 though, of course, electromagnetic deflecting coils could be used. It is presumed, though this is not a necessary presumption, that scanning in the tube is to be effected along a raster of lines such as is normally employed in television. This scanning action is effected under the control of a suitable master generator 6 which controls two saw tooth wave generators 7 and 8 for producing mutually perpendicular deflections as in the ordinary well known way, 8 being the line deflection saw tooth source. The scanning speed may, for one purpose or another, be variable, a fact which is diagrammatically indicated by showing an arrow on the master generator 6.

The arrangement as so far described is as well known, and in usual practice a signal to be displayed is applied to the control electrode 2 to modulate the intensity of the scanning beam with the result, as already explained, that for a given input signal strength the brightness of the spot on the screen depends upon the scanning speed.

In accordance with this invention the control electrode 2 is not modulated by input signals but is set to a desired bias potential value, e.g. that corresponding to "peak white" by a D.C. bias potential applied at 9. The control electrode 2 is also subjected to a rectangular voltage waveform from any suitable waveform generator 10 such as a generator of the multivibrator type. The amplitude of the rectangular waveform from the generator 10 is such that during positive portions of the waveform, the beam in the tube is of a full predetermined intensity and during negative portions of the waveform the beam is cut off. The frequency of the waveform from the source 10 is such that the period occupied by the beam in the tube in moving through its own width along the screen 3 is divided into two portions in one of which the beam is "on" and in the other of which the beam is "off." If the scanning speed varies, the frequency from the source 10 is also varied in such manner as to maintain the above described relationship between the said frequency and the scanning speed. The necessary control of the frequency of the source 10 is effected in any convenient manner known per se by control exercised by the output from the saw tooth generator 8, the lead 11 indicating this frequency control. For example, the frequency control of a multivibrator is discussed by Terman on page 639 of "Electronic and Radio Engineering," fourth edition, published by McGraw-Hill. In order to achieve the necessary bias voltage to which the grid leak resistor referred to by Terman is returned, the sawtooth output of generator 8 may be differentiated. Differentiation is discussed by Terman on page 622 et seq. of the above mentioned text. The manner in which the output of generator 10 is pulse width modulated may be in accordance with that disclosed by Terman on page 639.

Input signals to be displayed are applied at terminal 12 to effect in any manner known per se, pulse width modulation of the positive portions of the pulses from the source 10. In other words, the signal control is such as to modulate the lengths of the positive going pulses by means of which the beam in the tube is switched on. There is thus a possible range of positive pulse width modulation extending between the limits of zero positive pulse width and positive pulse width equal to the time interval between the beginnings of two successive positive pulses. There are numerous known ways by which such pulse width modulation can be obtained and it is accordingly not thought necessary to describe an actual circuit arrangement here. The invention is, of course, not limited to this particular form of pulse width modulation, i.e. the form in which only the positive pulses are modulated in width. It is not necessary that the period of output of generator 10 be the same as the time needed for the electron beam to scan through its own width. For all practical purposes, however, this relationship is necessary if tolerable definition is to be achieved. The period of output of generator 10, for example, could be longer than the time taken for the electron beam to scan through its own width, but if this were the case, the accepted standards of definition would not be achieved. The limits, therefore, between which the period may be varied depend upon the definition which is acceptable in any particular case.

FIGURE 2 requires little description in view of the description already given of FIGURE 1 and in view of the fact that where possible like references are used for like parts in both figures. In FIGURE 2 the tube is of the direct viewing storage tube type and is given the reference 21. It has a fluorescent screen 22, a storage mesh or grid elertrode 23, a so-called "writing" gun 24 and a so-called "flood" gun, the latter being represented purely schematically at 25. Focusing and deflecting coil system for the writing gun are schematically indicated by a coil 26. The writing gun has, of course, to produce scanning action and the flood gun merely to "flood" the scanned area, and any means known per se may be provided for these purposes. A saw tooth wave source 8, which may be variable in frequency as indicated by the arrow across it, provides scanning deflection for the writing electron beam from the gun 24. A rectangular waveform from a suitable source 10 interrupts the electron beam from the gun 24 at a frequency having a time period corresponding to the time taken for the electron beam from the writing gun to move along the mesh 23 by a distance equal to its own width thereon. As in FIGURE 1, the frequency of the interrupting waveform from the source 10 is co-related to the scanning speed by a frequency control exercised in any convenient known way by the scanning waveform generator 8, this frequency control being indicated as applied by signals fed over the lead 11. Again, as in FIGURE 1, signal input is applied at 12 to effect pulse width modulation of the positive pulses applied from the source 10 to the control electrode of the gun 24.

Referring to FIGURE 3 of the drawing, $t$ is the period taken for the electron beam to scan through its own width while the $a$ portion of the rectangular waveform which represents the output from generator 10 is that portion which causes the beam to be at full intensity, and the $b$ portion is that portion which causes the tube to cut off.

I claim:

1. A cathode ray tube display arrangement comprising means for generating an electron beam, scanning means for scanning said beam across said tube, and means for alternately switching the scanning electron beam between two predetermined limits of intensity at a cyclic frequency which is co-related to the scanning speed in such manner that said beam has one limiting intensity during part of each period during which it moves through its own width and the other limiting intensity during the remaining part of said period, said switching means including signal means, controlled by the signal to be displayed, for controlling the length of at least one of the two parts which make up said period.

2. An arrangement as claimed in claim 1 wherein one of said limiting intensities is zero intensity, the beam being completely switched off during part of each of said periods.

3. An arrangement as claimed in claim 1 wherein said switching means controls only the length of the parts of the said periods during which the beam is of the larger intensity.

4. A cathode ray tube display arrangement including beam generating means and beam scanning means wherein means are provided for subjecting the beam to control to one or another of two predetermined limits of intensity, by a signal controlled, pulse width modulated wave of a frequency whose time period equals the time taken by the beam to move in the direction of scanning by the width of said beam on the area scanned.

References Cited in the file of this patent

UNITED STATES PATENTS

| | | |
|---|---|---|
| 2,567,861 | Silliman | Sept. 11, 1951 |
| 2,700,741 | Brown et al. | Jan. 25, 1955 |
| 2,860,284 | McKim | Nov. 11, 1958 |
| 2,993,142 | Harvey | July 18, 1961 |